United States Patent
Hung

(10) Patent No.: US 10,503,411 B2
(45) Date of Patent: Dec. 10, 2019

(54) DATA STORAGE DEVICE AND METHOD FOR OPERATING NON-VOLATILE MEMORY

(71) Applicant: Silicon Motion, Inc., Jhubei (TW)

(72) Inventor: Ying-Chun Hung, Baoshan Township (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 15/954,223

(22) Filed: Apr. 16, 2018

(65) Prior Publication Data
US 2019/0018598 A1 Jan. 17, 2019

(30) Foreign Application Priority Data
Jul. 13, 2017 (TW) .............................. 106123733 A

(51) Int. Cl.
*G06F 3/06* (2006.01)
*G06F 12/02* (2006.01)
(52) U.S. Cl.
CPC ............ *G06F 3/0613* (2013.01); *G06F 3/064* (2013.01); *G06F 3/0616* (2013.01); *G06F 3/0652* (2013.01); *G06F 3/0679* (2013.01); *G06F 3/0688* (2013.01); *G06F 12/0246* (2013.01)
(58) Field of Classification Search
CPC .... G06F 3/0688; G06F 3/0652; G06F 3/0613; G06F 3/0679; G06F 2212/7205; G06F 3/064; G06F 12/0253; G06F 3/0616

USPC ......................................................... 711/103
See application file for complete search history.

(56) References Cited

U.S. PATENT DOCUMENTS

| 8,203,881 B2 | 6/2012 | Kim et al. | |
| 2010/0122016 A1* | 5/2010 | Marotta | G06F 12/0246 |
| | | | 711/103 |
| 2010/0149872 A1 | 6/2010 | Aoyagi | |
| 2010/0229007 A1 | 9/2010 | Park | |
| 2011/0179322 A1 | 7/2011 | Lee et al. | |
| 2012/0311293 A1* | 12/2012 | Nemazie | G06F 12/0893 |
| | | | 711/171 |
| 2014/0003167 A1 | 1/2014 | Jung | |
| 2014/0071753 A1* | 3/2014 | Shin | G06F 12/0246 |
| | | | 365/185.03 |
| 2017/0160976 A1* | 6/2017 | Thangaraj | G06F 3/0634 |
| 2018/0365143 A1* | 12/2018 | Hung | G06F 12/0246 |

* cited by examiner

*Primary Examiner* — Hashem Farrokh
(74) *Attorney, Agent, or Firm* — Wang Law Firm, Inc.

(57) ABSTRACT

An optimized operating method for a non-volatile memory. A microcontroller allocates the non-volatile memory to store write data issued by a host. The microcontroller dynamically adjusts a first-writing-mode threshold. The first-writing-mode threshold value is provided for the microcontroller to determine whether to use a first writing mode to allocate the non-volatile memory to store the write data issued by the host. In comparison with the first writing mode, more bits of data are stored in one storage cell in a second writing mode.

12 Claims, 5 Drawing Sheets

DATA STORAGE DEVICE AND METHOD FOR OPERATING NON-VOLATILE MEMORY

CROSS REFERENCE TO RELATED APPLICATIONS

This Application claims priority of Taiwan Patent Application No. 106123733, filed on Jul. 13, 2017, the entirety of which is incorporated by reference herein.

BACKGROUND OF THE INVENTION

Field of the Invention

The present invention relates to optimization of an operating method for a non-volatile memory.

Description of the Related Art

There are various forms of non-volatile memory (NVM) used in data storage devices for long-term data retention, such as flash memory, magnetoresistive RAM, ferroelectric RAM, resistive RAM, spin transfer torque-RAM (STT-RAM), and so on.

The lifespan of non-volatile memory is limited. For example, the erasure of each block of a flash memory should be limited. When the number of times that a block has been erased exceeds an upper limit, the block should be protected from being further allocated to receive write data. With the increasing number of blocks exceeding the upper limit on the number of erasures, the flash memory approaches the end of its lifespan. Since the erasing demand depends on the method of operating the flash memory, how to optimize the operating method for the non-volatile memory and then extend the life of the device is a major issue in the technical field.

BRIEF SUMMARY OF THE INVENTION

A data storage device in accordance with an exemplary embodiment of the disclosure has a non-volatile memory and a microcontroller. The microcontroller allocates the non-volatile memory to store write data issued by a host. The microcontroller dynamically adjusts a first-writing-mode threshold. The first-writing-mode threshold value is provided for the microcontroller to determine whether to use a first writing mode to allocate the non-volatile memory to store the write data issued by the host. In comparison with the first writing mode, more bits of data are stored in one storage cell in a second writing mode.

In an exemplary embodiment, the microcontroller dynamically adjusts the first-writing-mode threshold when releasing a space of the non-volatile memory.

In an exemplary embodiment, when releasing a space of the non-volatile memory by foreground operations, the microcontroller increases the first-writing-mode threshold. The microcontroller responds to the host by the foreground operations.

In an exemplary embodiment, when releasing a space of the non-volatile memory by background operations, the microcontroller decreases the first-writing-mode threshold. The microcontroller performs the background operations without being requested to by the host.

In another exemplary embodiment, a method for operating a non-volatile memory is disclosed, which comprises: allocating a non-volatile memory to store write data issued by a host; dynamically adjusting a first-writing-mode threshold; and considering the first-writing-mode threshold value, determining whether to use a first writing mode to allocate the non-volatile memory to store the write data issued by the host. In comparison with the first writing mode, more bits of data are stored in one storage cell in a second writing mode.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory may be a memory device for long-term data retention such as a flash memory, a magnetoresistive RAM, a ferroelectric RAM, a resistive RAM, a spin transfer torque-RAM (STT-RAM) and so on. The following discussion is regarding flash memory in particular as an example, but it is not intended to limit the application to the field of flash memory.

The flash memory is often used as a storage medium in today's data storage devices, for implementations of a memory card, a USB flash device, an SSD and so on. In another exemplary embodiment, the flash memory is packaged with a controller to form a multiple-chip package and named eMMC.

A data storage device using a flash memory as a storage medium can be applied to a variety of electronic devices, including a smartphone, a wearable device, a tablet computer, a virtual reality device, etc. A central processing unit (CPU) of an electronic device may be regarded as a host operating a data storage device equipped on the electronic device.

The storage space of a flash memory may be managed in blocks. Each block can be allocated to use a specific form to store data. For example, a block allocated to provide single level cells (SLCs) to store data is called an SLC block, and a block allocated to provide triple level cells (TLCs) to store data is called a TLC block. An SLC (single level cell) stores one single bit. A TLC (triple level cell) stores three bits. At the same physical storage size, the amount of data that can be stored in SLCs is only one-third of what can be stored in TLCs. In addition, a TLC block can be operated in a TLC writing mode or an SLC writing mode. In SLC writing mode, a TLC block imitates an SLC block, i.e., each storage cell of the TLC block capable of storage of 3-bit data is operated to store only one bit of data (valid data). In TLC writing mode, each storage cell of the TLC block stores 3 bits of data.

Figure 1A:
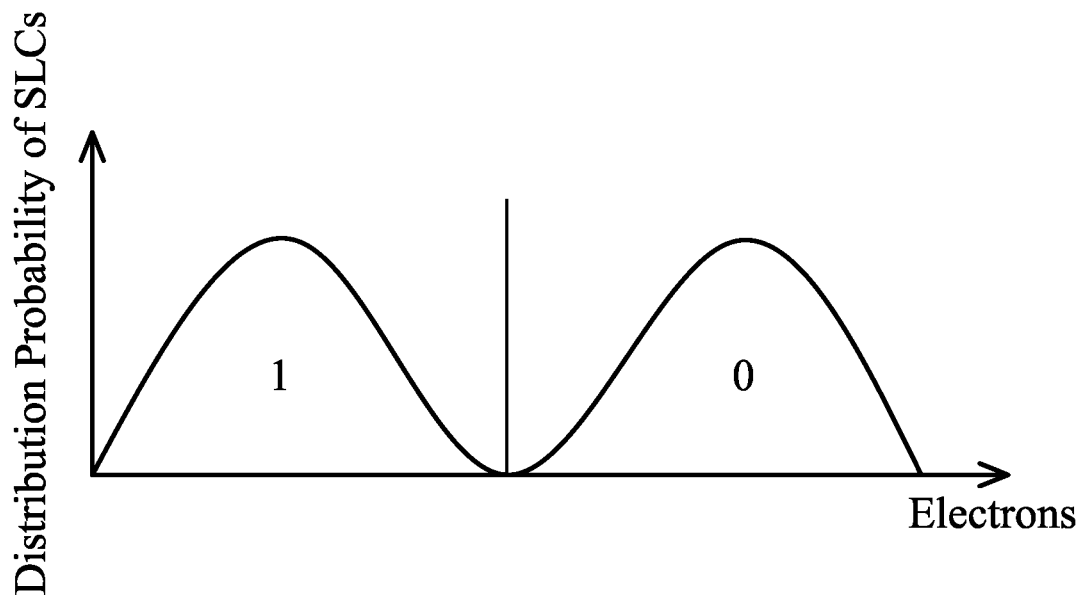
FIGS. 1A and 1B illustrate the distribution probability of storage cells for SLC and TLC techniques, respectively, with the logical meanings changed by modifying the floating gate electrons.
Figure 1B:
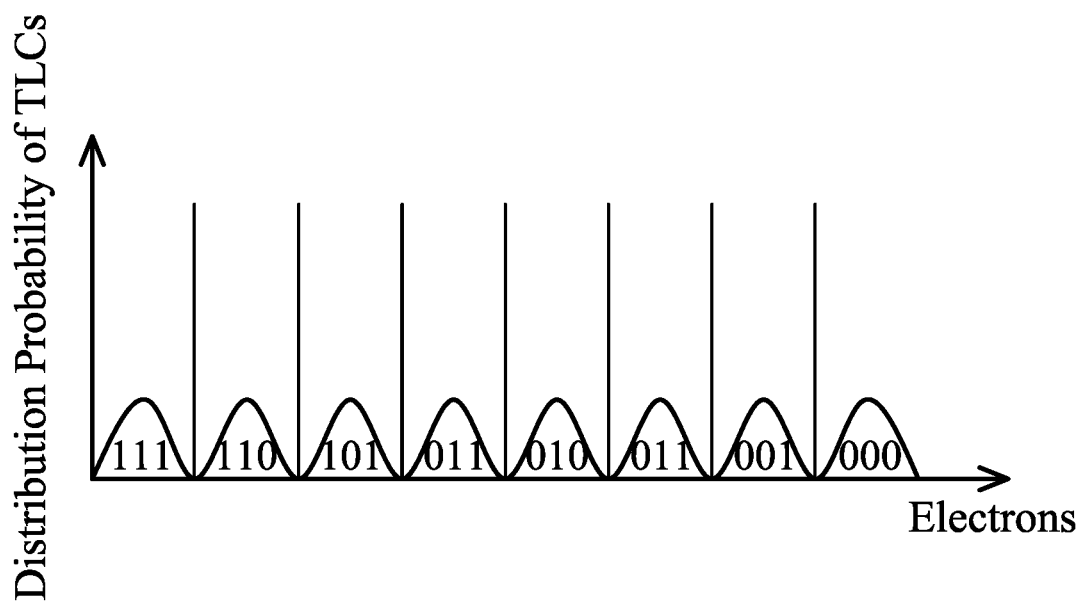

FIGS. 1A and 1B illustrate the distribution probability of storage cells for SLC and TLC techniques, respectively, with the logical meanings changed by modifying the floating gate electrons. As shown, the logical definition of a storage cell is determined according to the gate floating electrons of the storage cell. The logical boundary of SLC is clearer in comparison with the logical boundaries of TLC. Single level cells (SLCs) are more reliable and allow a faster writing speed. Triple level cells (TLCs) have the advantage of high storage capacity. Single level cells (SLCs) are mostly used for data caching. Data may first be cached by single level cells and then collected in triple level cells (TLCs). The frequent data movement from SLCs to TLCs may result in write amplification problems. Because of the excessive erasure operations, the lifetime of the flash memory may be short. Considering memory capacity, the data in SLCs is moved to TLCs (e.g., by garbage collection) during the proper time, which can also result in excessive erasure operations. Considering the lifespan of flash memory, how to optimize the allocation of blocks (e.g., switching between SLC and TLC writing modes) is the focus of the following discussion.

Figure 2:
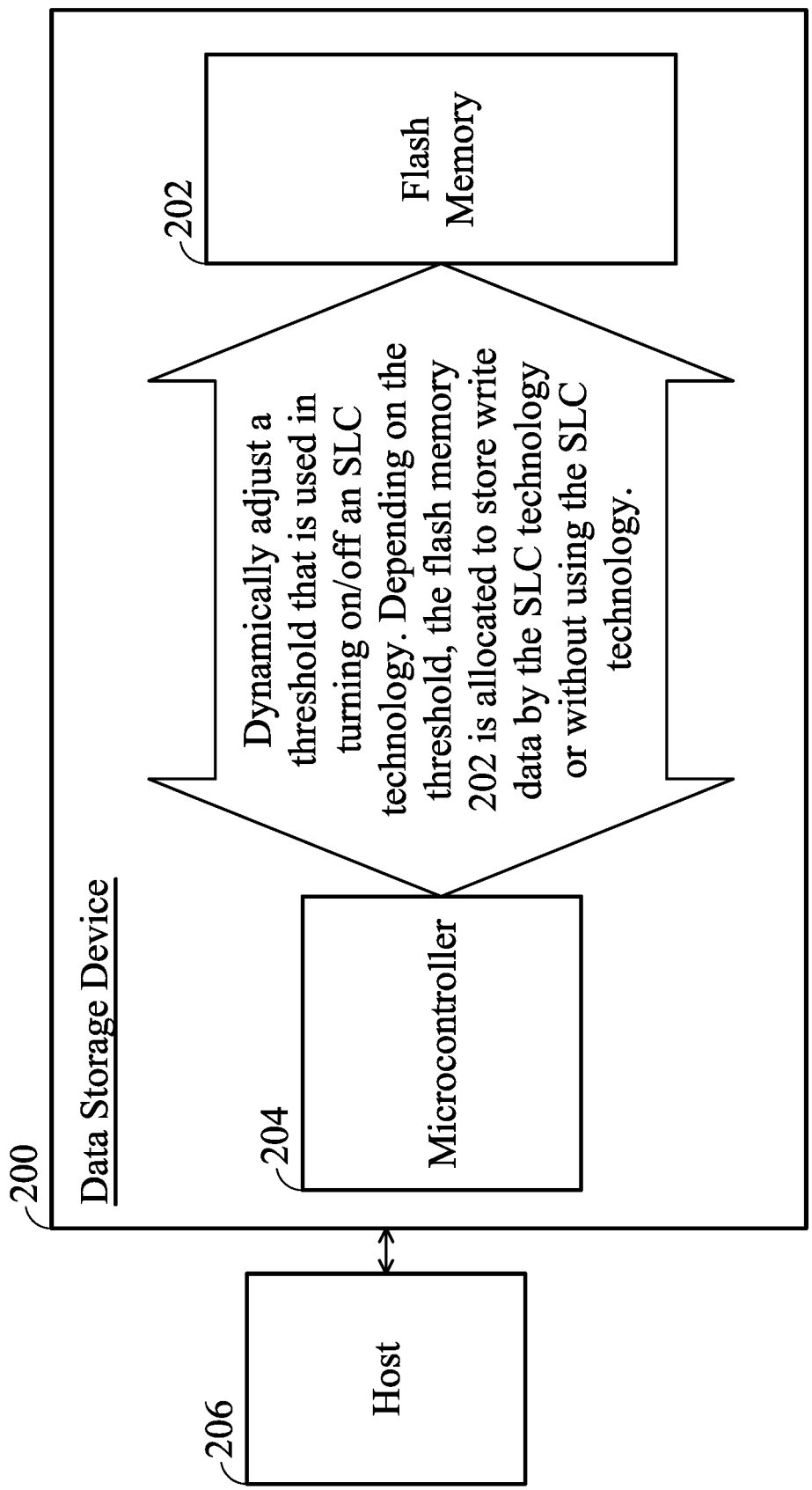
FIG. 2 is a block diagram depicting a data storage device 200 in accordance with an exemplary embodiment of the disclosure.

FIG. 2 is a block diagram depicting a data storage device 200 in accordance with an exemplary embodiment of the disclosure. The data storage device 200 uses a flash memory 202 as the storage medium and has a microcontroller 204. Through the microcontroller 204, a host 206 accesses the flash memory 202. The microcontroller 204 may be loaded with code and has computing hardware that executes the code. The storage space of the flash memory 202 is managed in units of blocks. As described above, the flash memory 202 can be individually allocated to store data in an SLC or TLC writing mode.

When allocating the flash memory 202 to provide a space to store the write data issued by the host 206, the microcontroller 204 checks a judgment condition:

SpareBlk_Num>SLC_Th

SpareBlk_Num is the total number of spare (or free) blocks of the flash memory 202. SLC_Th is a threshold value for turning on/off the SLC writing mode. In one example, the total number of blocks within the flash memory 202 is 1024, and the threshold value SLC_Th is 512. When the flash memory 202 is empty, the total number SpareBlk_Num of spare blocks is 1024. When allocating the flash memory 202 to provide a space to store the write data issued by the host 206, the microcontroller 204 checks the aforementioned judgment condition and finds that the judgment condition is satisfied. This means that there is plenty of space in the flash memory 202, not yet pursuing high storage density. The microcontroller 204, therefore, writes data to the flash memory 202 in the SLC writing mode, taking advantage of the high reliability and high write performance of SLC technology. After a certain amount of data is stored, SpareBlk_Num is reduced to 512 so that the judgment condition is no longer satisfied. This means that large amount of data has been written to the flash memory 202, resulting in considerable consumption of blocks of the flash memory 202. The microcontroller 204, therefore, writes data to the flash memory 202 in the TLC writing mode, taking advantage of the high storage density of TLC technology. The block consumption speed of the blocks of the flash memory 202 is reduced.

Specifically, the microcontroller 204 dynamically adjusts the threshold value SLC_Th to meet the habits of the user of the data storage device 200. When the user usually writes a lot of data to the flash memory 202, the threshold value SLC_Th may be increased to a greater value, such as 768. As a result, the aforementioned judgment condition is not easy to be satisfied. The microcontroller 204 allocates blocks to store the large amount of write data in the TLC writing mode, less efficient but good in data density. The large amount of write data is stored in the flash memory 202 in a proper way. In addition, since less data is stored in the SLCs, the data migration from SLCs to TLCs is prevented and the operational efficiency of the data storage device 200 is significantly improved. Conversely, when the user only stores a small amount of data to the data storage device 200, the threshold value SLC_Th may be decreased to a lower value, such as 128. As a result, the aforementioned judgment condition is easier to meet. The microcontroller 204 allocates blocks to store the large amount of write data in the SLC writing mode, which is quite efficient, although the data density is reduced. The small amount of write data is also stored in the flash memory 202 in a proper way.

In an exemplary embodiment, the microcontroller 204 dynamically adjusts the threshold value SLC_TH based on the change of the number of spare blocks SpareBlk_Num. In an exemplary embodiment, the threshold value SLC_Th is decreased by 1 as the number of spare blocks SpareBlk_Num is decreased by 4. When the number of spare blocks SpareBlk_Num is decreased to 340 and the threshold value SLC_Th is decreased to 341, the aforementioned judgment condition is not satisfied. The aforementioned judgment condition is true again when the number of spare blocks SpareBlk_Num is increased by data migration or garbage collection.

In another exemplary embodiment, the microcontroller 204 dynamically adjusts the threshold value SLC_Th according to how long the aforementioned judgment condition has been satisfied. For example, when the aforementioned judgment condition has been satisfied for more than 1 hour, the threshold value SLC_Th is increased by 1. If not, the threshold value SLC_Th is decreased by 1.

In an exemplary embodiment, the microcontroller 204 dynamically adjusts the threshold value SLC_TH with foreground/background operations. For example, the large amount of write data may result in a sudden drop in the amount of spare blocks (SpareBlk_Num) in the flash memory 202. The microcontroller 204 needs to perform garbage collection more frequently by foreground operations to release blocks of space to guarantee the sufficient space for the future data writing. In response to the block releasing of the foreground operations, the microcontroller 204 may be driven to increase the threshold value SLC_Th (e.g. by adding 1). When the spare blocks are consumed to cope with the large amount of write data, the threshold value SLC_Th is increased. As a result, the judgment condition SpareBlk_Num>SLC_Th is not easily satisfied and the microcontroller 204 tends to allocate the flash memory 202 to store data using TLC technology. The high-density advantage of TLC technology facilitates the writing of large amounts of data. In particular, since data is prevented from being stored in the flash memory 202 by SLC technology, SLC-to-TLC data movement for meeting the demand for high density almost does not happen. The operational efficiency of the data storage device 200 is considerably improved. A surge on erase counts due to the SLC-to-TLC data movement is avoided. A warranty period of the data storage device 200 is prolonged.

When blocks of space are released by background operations, the microcontroller 204 decreases the threshold value SLC_Th (e.g. by subtracting 1). For example, when the host 206 does not request to operate (e.g. read or write) the flash memory 202, the microcontroller 204 may perform SLC to TLC data migration (another type of garbage collection) in the free time interval. According to the block releasing performed by background operations, the microcontroller 204 may be driven to decrease the threshold value SLC_Th (e.g. by subtracting 1). The threshold value (SLC_Th) is adjusted towards the initial value.

Figure 3:
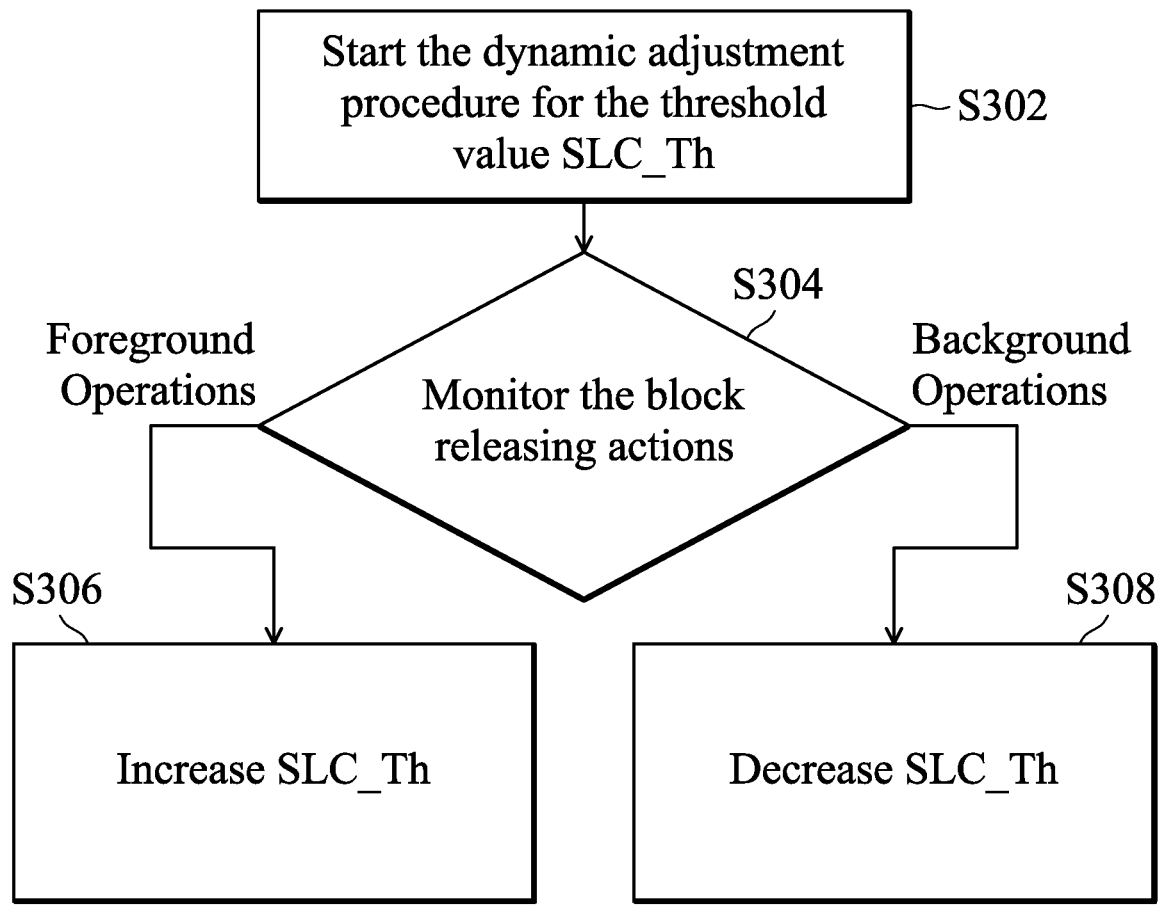
FIG. 3 is a flowchart depicting the dynamic adjustment on the threshold value SLC_Th in accordance with an exemplary embodiment of the disclosure.

FIG. 3 is a flowchart depicting the dynamic adjustment on the threshold value SLC_Th in accordance with an exemplary embodiment of the disclosure. In step S302, the microcontroller 204 starts the dynamic adjustment procedure for the threshold value SLC_Th. In step S304, the microcontroller 204 monitors the block releasing actions. When a block releasing action is performed by foreground operations (e.g. to cope with write requests from the host 206), step S306 is performed to increase the threshold value SLC_Th. For example, the threshold value SLC_Th may be increased by adding 1. When a block releasing action is performed by background operations (e.g. when no read/write request is issued from the host 206 and the microcontroller 204 cleans the storage space during a free time interval), step S308 is performed to decrease the threshold value SLC_Th. For example, the threshold value SLC_Th may be decreased by 1.

Figure 4:
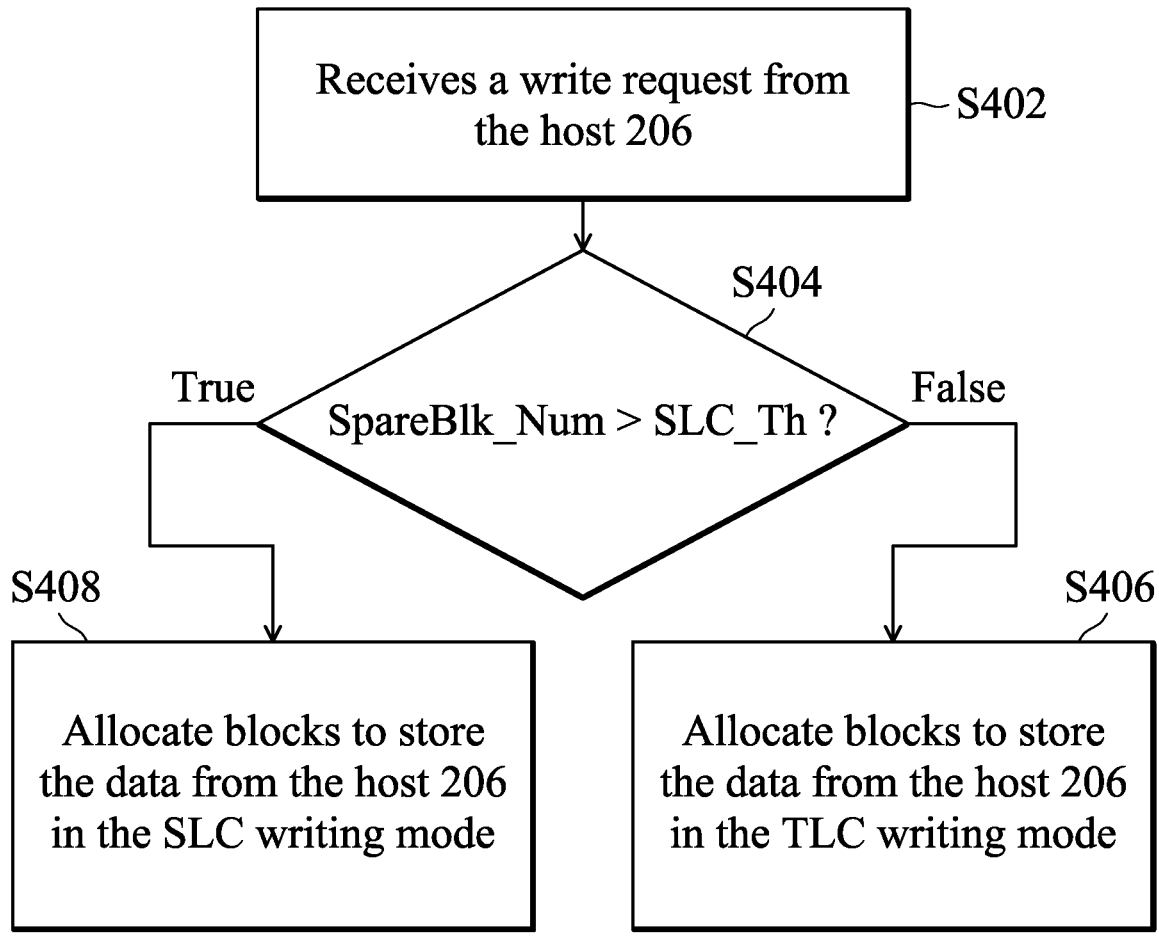
FIG. 4 is a flowchart depicting how the microcontroller 204 operates the flash memory 202 in accordance with an exemplary embodiment of the disclosure, wherein a judgment condition is used to determine the storage technology applied to block allocation, and the aforementioned threshold value SLC_th is considered in the judgment condition.

FIG. 4 is a flowchart depicting how the microcontroller 204 operates the flash memory 202 in accordance with an exemplary embodiment of the disclosure. A judgment condition is used to determine the storage technology applied to block allocation. The aforementioned threshold value SLC_th is considered in the judgment condition. In FIG. 4, the microcontroller 204 operates the flash memory 202 depending on whether the aforementioned judgment condition, SpareBlk_Num>SLC_Th, is true or not. In step S402, the microcontroller 204 receives a write request from the host 206. In step S404, the microcontroller 204 checks whether the aforementioned judgment condition, SpareBlk_Num>SLC_Th, is true or not. If not, it means that the spare blocks in the flash memory 202 is not sufficient. In step S406, the microcontroller 204 allocates blocks to store the data from the host 206 in the TLC writing mode. If yes, it means that the spare space of the flash memory 202 is sufficient. In step S408, the microcontroller 204 allocates blocks to store the data from the host 206 in the SLC writing mode, taking advantage of the high reliability and the high writing speed of the SLC writing mode. According to the dynamic adjustment performed on the threshold value SLC_Th of FIG. 3, the microcontroller 204 properly switches between the SLC writing mode and the TLC writing mode to meet the user's needs. The warranty period of the data storage device 200 is prolonged.

Figure 5:
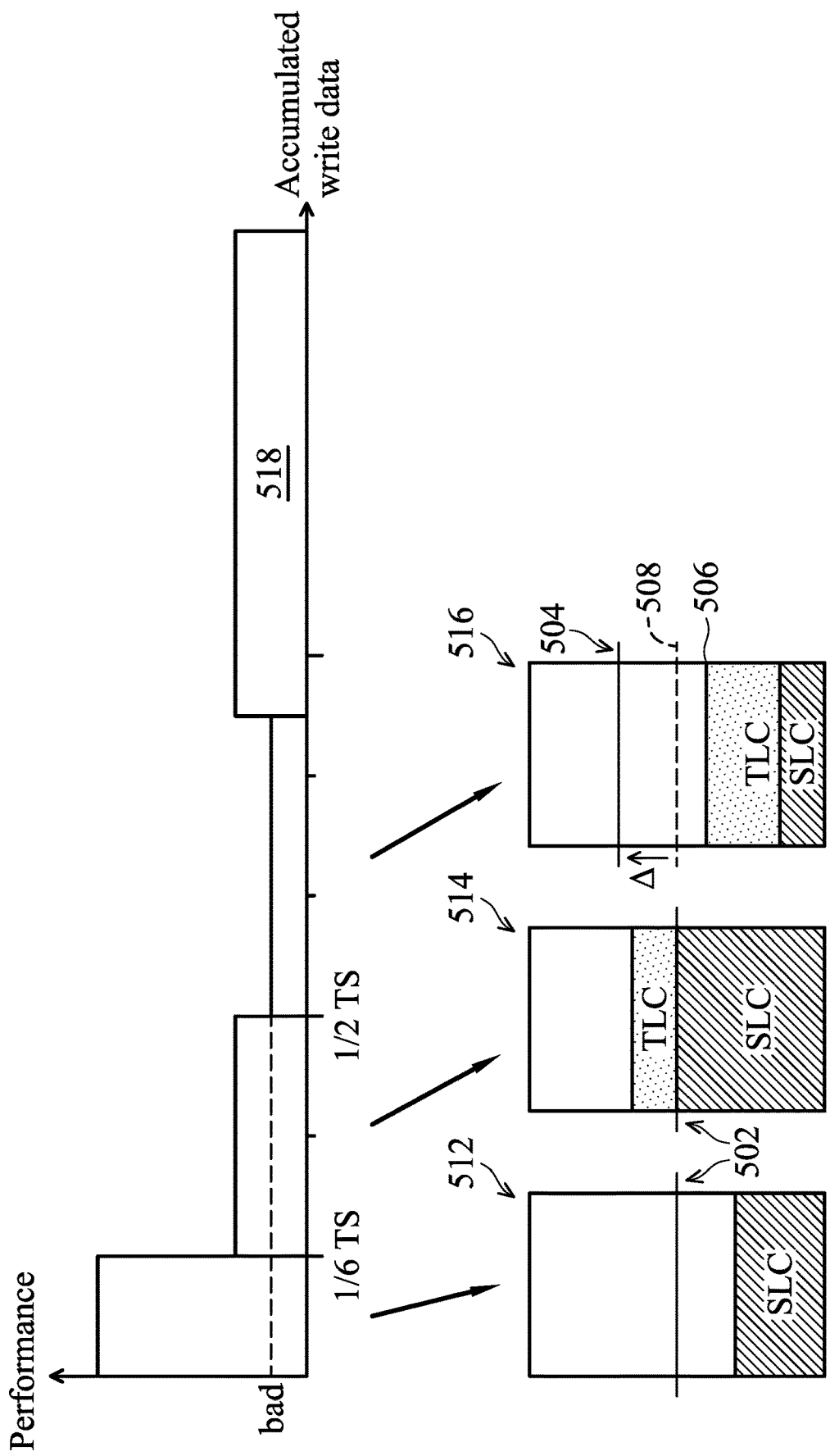
FIG. 5 illustrates an example in accordance with an exemplary embodiment of the disclosure, wherein the upper half of FIG. 5 is a performance map and the lower half of FIG. 5 shows how many spare blocks remain in the different time points.

FIG. 5 illustrates an example in accordance with an exemplary embodiment of the disclosure. The upper half of FIG. 5 is a performance map. The accumulated amount of all the write data that has ever been written to the flash memory 202 is represented along the horizontal axis. The performance of the data storage device 200 is represented along the vertical axis. The lower half of FIG. 5 shows how many spare blocks remain in the different time points. The blank area represents the spare blocks. The shaded area represents the SLC blocks. The dotted area represents the TLC blocks. The aforementioned judgment condition SpareBlk_Num>SLC_Th is considered in the allocation of the SLC and TLC blocks. The threshold value SLC_Th is dynamically adjusted.

The initial value of SLC_Th is set as one half of the total block number of the flash memory 202 as indicated by a reference numeral 502, which corresponds to one-sixth of the total logical storage size of the flash memory 202. In FIG. 5, TS represents the data storage capability of the flash memory 202. Before writing ⅙TS of data to an empty card formed by the flash memory 202, the usage of all blocks in the flash memory 202 is represented by the reference numeral 512. SLC blocks are allocated to store write data. The data storage device 200 operates efficiently.

When more than ⅙TS of write data has ever been written to the flash memory 202, the usage of all blocks of the flash memory 202 is represented by the reference numeral 514. TLC blocks are allocated to store write data. The performance of the data storage device 200 is slightly reduced.

When more than ½TS of write data has ever been written to the flash memory 202 over its lifespan, the usage of all blocks of the flash memory 202 is represented by the reference numeral 516. In response to the series of write requests from the host 206, foreground operations are performed to allocate TLC blocks to store the write data and to move data from SLC blocks to TLC blocks. Blocks of space are released by the SLC-to-TLC movement to make room to receive subsequent write data. The performance of the data storage device 200 may be worse (regarded as bad performance). The worse performance of the data storage device 200 is dealt with by the dynamic adjustment of the threshold value SLC_Th of the disclosure. The block releasing due to foreground operations increases the threshold value SLC_Th. As shown, the amount of the increase is A. The threshold value SLC_Th is increased to the level indicated by a reference numeral 504. Because of the dynamic adjustment of the threshold value SLC_Th, the microcontroller 204 is not switched back to the SLC writing mode even though the amount of data blocks has been suppressed to lower than the initial setting of the threshold value SLC_Th (indicated by the reference numeral 508). Referring to the period indicated by the reference numeral 518, the write data is written to the flash memory 202 in the TLC writing mode. The demand to move data from SLC blocks to TLC blocks is suppressed. During the period 518, the performance of the data storage device 200 is improved in comparison with the bad performance during the previous period.

The judgment condition SpareBlk_Num>SLC_Th may be replaced by other conditions. Any technique involving dynamic adjustment on a threshold value that is used to turn on/off an SLC writing mode is considered as being within the scope of the disclosure.

In another exemplary embodiment, the microcontroller 204 operates the flash memory 202 to switch between the SLC writing mode and another writing mode that uses one storage cell to store more or fewer bits of data. For example, one storage cell of the flash memory 202 may be allocated to store two bits and is called a multiple level cell (MLC). The microcontroller 204 may operate the flash memory 202 to switch between an SLC writing mode and an MLC writing mode. In another exemplary embodiment, the microcontroller 204 may operate the flash memory 202 to switch among three or more kinds of writing modes. The microcontroller 204 may operate the flash memory 202 to switch among an SLC writing mode, an MLC writing mode and a TLC writing mode. In addition, as technology evolves, the technology of storing more bits of data in a single storage cell can also be applied to the present case. The MLC and TLC techniques described above can also be replaced by other numerical multi-level cell techniques.

Other techniques that use the aforementioned concepts to operate a non-volatile memory are within the scope of the disclosure. Based on the above contents, the present invention further relates to methods for operating a non-volatile memory.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a microcontroller, allocating blocks of the non-volatile memory to store write data issued by a host,
wherein:
the microcontroller dynamically adjusts a first-writing-mode threshold;
the first-writing-mode threshold value is provided for the microcontroller to determine whether to use a first writing mode or a second writing mode to allocate the blocks of the non-volatile memory to store the write data issued by the host;
in comparison with the first writing mode, more bits of data are stored in one storage cell in the second writing mode;
when available blocks of the non-volatile memory is greater than the first-writing-mode threshold, the microcontroller programs the write data issued by the host to the non-volatile memory in the first writing mode;
when available blocks of the non-volatile memory is not greater than the first-writing-mode threshold, the microcontroller programs the write data issued by the host to the non-volatile memory in the second writing mode;
when releasing a space of the non-volatile memory by background operations, the microcontroller decreases the first-writing-mode threshold; and
the microcontroller performs the background operations without being requested to by the host.

2. The data storage device as claimed in claim 1, wherein:
when releasing a space of the non-volatile memory by foreground operations, the microcontroller increases the first-writing-mode threshold; and
the microcontroller responds to the host by the foreground operations.

3. The data storage device as claimed in claim 1, wherein:
the non-volatile memory is a flash memory managed in blocks;
in the first-writing mode, data is stored in single-level cells with each storage cell storing one bit of data; and
in the second-writing mode, each storage cell stores more than one bit.

4. The data storage device as claimed in claim 3, wherein:
when using the second-writing mode to copy data stored in the first-writing mode and thereby a block is released to store subsequent write data issued by the host, the microcontroller increases the first-writing-mode threshold.

5. The data storage device as claimed in claim 3, wherein:
when updating data and thereby a block is released, the microcontroller increases the first-writing-mode threshold.

6. The data storage device as claimed in claim 3, wherein:
when releasing a block by garbage collection performed by background operations, the microcontroller decreases the first-writing-mode threshold; and
the microcontroller performs the background operations without being requested to by the host.

7. A method for operating a non-volatile memory, comprising:
allocating blocks of a non-volatile memory to store write data issued by a host;
dynamically adjusting a first-writing-mode threshold;
based on the first-writing-mode threshold value, determining whether to use a first writing mode or a second writing mode to allocate the blocks of the non-volatile memory to store the write data issued by the host,
wherein:
in comparison with the first writing mode, more bits of data are stored in one storage cell in the second writing mode;
when available blocks of the non-volatile memory is greater than the first-writing-mode threshold, t the write data issued by the host is programmed to the non-volatile memory in the first writing mode;
when available blocks of the non-volatile memory is not greater than the first-writing-mode threshold, the write data issued by the host is programmed to the non-volatile memory in the second writing mode;
when releasing a space of the non-volatile memory by background operations, the first-writing-mode threshold is decreased; and
the background operations are performed without being requested to by the host.

8. The method as claimed in claim 7, further comprising:
increasing the first-writing-mode threshold when releasing a space of the non-volatile memory by foreground operations,
wherein the foreground operations are performed to respond to the host.

9. The method as claimed in claim 7, wherein:
the non-volatile memory is a flash memory managed in blocks;
in the first-writing mode, data is stored in single-level cells with each storage cell storing one bit of data; and
in the second-writing mode, each storage cell stores more than one bit.

10. The method as claimed in claim 9, wherein:
when using the second-writing mode to copy data stored in the first-writing mode and thereby a block is released to store subsequent write data issued by the host, the first-writing-mode threshold is increased.

11. The method as claimed in claim 9, wherein:
when updating data and thereby a block is released, the first-writing-mode threshold is increased.

12. The method as claimed in claim 9, further comprising:
   decreasing the first-writing-mode threshold when releasing a block by garbage collection performed by background operations,
   wherein the background operations are performed without being requested to by the host.

* * * * *